Nov. 18, 1930.  J. RUSKAMP  1,782,075
STOCK WATERER
Filed Dec. 10, 1928  2 Sheets-Sheet 1
Fig.1.
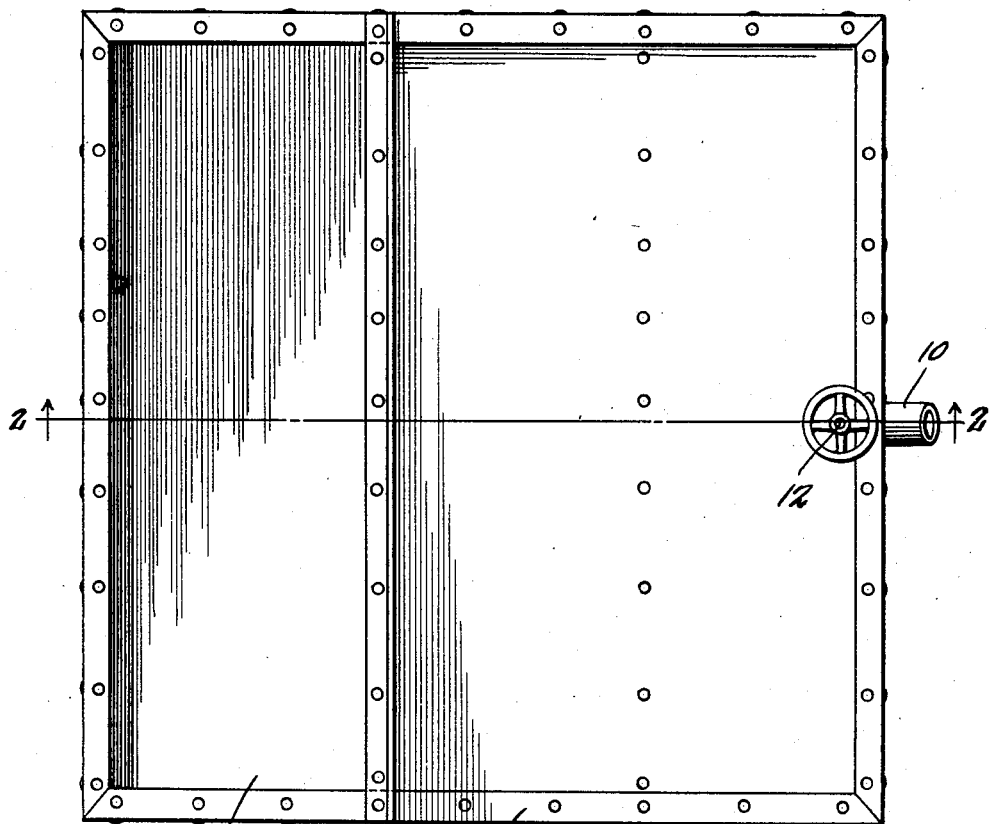
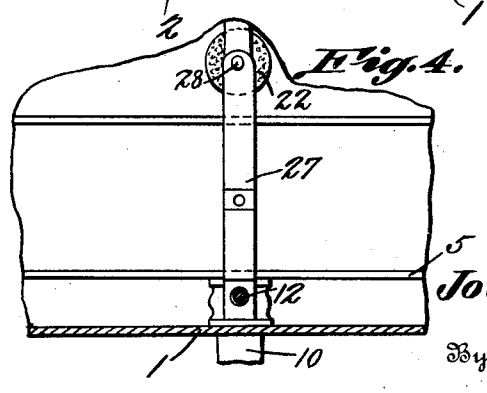
Fig.4.
Joseph Ruskamp, Inventor
By C.A. Snow & Co.
Attorneys Nov. 18, 1930.  J. RUSKAMP  1,782,075
STOCK WATERER
Filed Dec. 10, 1928  2 Sheets-Sheet 2

Joseph Ruskamp, Inventor

Patented Nov. 18, 1930

1,782,075

UNITED STATES PATENT OFFICE

JOSEPH RUSKAMP, OF DODGE, NEBRASKA

STOCK WATERER

Application filed December 10, 1928. Serial No. 324,937.

This invention relates to apparatus for use in watering stock, one of the objects being to provide, in a single structure, separate troughs of different elevations to which live stock of different heights can have ready access.

Another object is to arrange the troughs in a single casing containing heating means whereby freezing of the contents of the trough is prevented.

Another object is to provide the trough with means for supplying an ample amount of water, the lower trough provided for hogs and similar stock, being provided with a means whereby it can be quickly drained of all sediment.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

Figure 2:
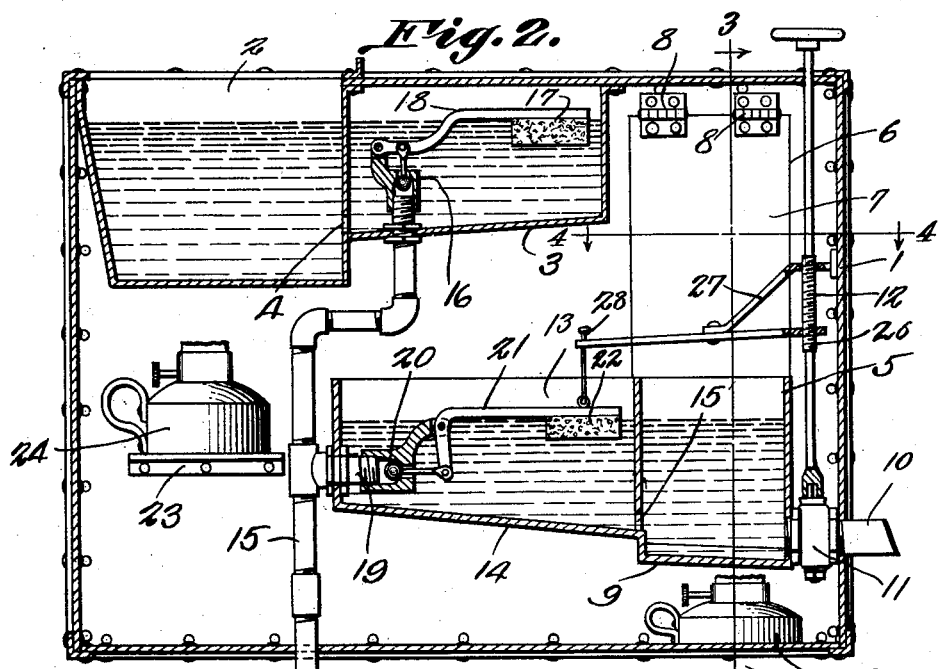
Figure 3:
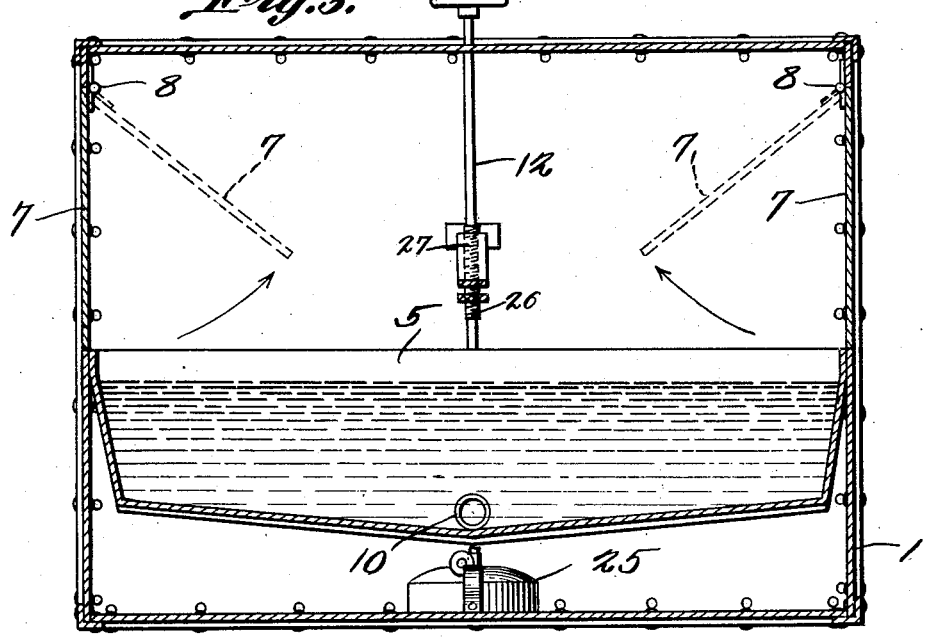

In said drawings,

Figure 1 is a plan view of the structure.
Figure 2 is a section on line 2—2, Figure 1.
Figure 3 is a section on line 3—3, Figure 2.
Figure 4 is a section on line 4—4, Figure 2.

Referring to the figures by characters of reference 1 designates a casing formed preferably of sheet metal and provided across the top portion thereof at one end with a depending trough 2 adapted to hold a supply of water for large live stock such as cattle and horses. A supply tank 3 is located within the casing below the top thereof and has its bottom inclined downwardly to an opening 4 through which water is adapted to flow into the trough 2.

Another trough 5 is supported within the casing 1 adjacent the other end thereof and openings 6 are provided in the sides of the casing at the ends of this trough. These openings are normally closed by doors 7 which are hingedly mounted as at 8 and adapted to open inwardly by pressure thereagainst. Thus when live stock comes against either or both of the doors 7 and pushes the same inwardly, the adjacent portion of the trough 5 will be exposed so that the water contained in the trough can be reached.

The trough 5 has its bottom 9 inclined downwardly toward a large outlet or drain pipe 10. This pipe has a gate valve 11 or the like adapted to be actuated by a removable key 12 extending downwardly through the top of the casing 1. A supply tank 13 is arranged in the casing 1 and has its bottom 14 inclined downwardly toward an opening 15' through which water is adapted to flow from tank 13 into trough 5.

A water supply pipe 15 is extended into the casing 1 and one end thereof opens into the tank 3 where it is provided with a valve 16 controlled by a float 17 and lever 18. When the water in the tank 3 and trough 2 reaches a predetermined level the float 17 will act to close the valve 16. When, however, the water drops below a predetermined level the valve 16 will be opened. As the outlet of pipe 15 is within the tank 3 it will not become clogged with foreign substances entering the trough 2.

Pipe 15 has a branch or extension 19 opening into the tank 13. This branch is provided with a valve 20 controlled by a lever 21 and a float 22 which operates in the same manner as the lever 18 and float 17 so as to maintain a predetermined water level in the tank 13 and the trough 5.

Any suitable heating means may be located in the casing. For example an oil burning lamp 24 can be mounted on a bracket 23 beneath the trough 2 and another oil burning lamp 25 can be mounted on the bottom of the casing 1 beneath the trough 5. As the casing 1 is normally closed the heat from these lamps will be ample to prevent the contents of the troughs from freezing.

If desired the rod 12 may be screw-threaded as indicated at 26, this screw-threaded portion extending through a bracket 27 that is slidable within casing 1. A short link 28 extends upwardly from the float lever 21 and has a knob or enlargement 29 at its free end. This link extends loosely through one end of the bracket 27. With this arrangement, when the rod 12 is rotated for the purpose of completely opening the valve 11, bracket 27 will come against the head or enlargement 29 and thrust it upwardly, thereby actuating the float lever 21 and pulling the valve 20 to closed position so as to shut off the supply of water to the tank. Consequently the tank can be drained through the opening 10. By partly closing the valve 11 the bracket 27 will be moved downwardly to an intermediate position, thereby allowing valve 20 to open, and at the same time allowing water to drain through said valve and the pipe 10. Thus there will be a constant flow of water to and from the tank.

By providing this structure the trough can be drained thoroughly so as to be kept clear of mud and other foreign substances and thereby keep the stock supplied with fresh water.

What is claimed is:

A stock waterer including a casing, a watering trough therein, a drain pipe leading from the trough and casing, a valve for controlling said pipe, a water supply pipe opening into the trough, a float actuated lever in the trough, a valve actuated thereby adapted to close when the float is raised, a threaded rod for actuating the drain valve, a slidable member actuated thereby, and means operated by said member when raised by the complete opening of the drain valve, for supporting the float lever and holding the supply valve closed.

In testimony that I claim the foregoing as my own, I have hereto affixed my signature.

JOSEPH RUSKAMP.